US012499382B2

(12) United States Patent
Balakrishnan et al.

(10) Patent No.: US 12,499,382 B2
(45) Date of Patent: Dec. 16, 2025

(54) SELECTIVE OPTICAL TUNING OF QUBIT TWO-LEVEL SYSTEM INTERACTIONS USING BANDPASS FILTERS

(71) Applicant: INTERNATIONAL BUSINESS MACHINES CORPORATION, Armonk, NY (US)

(72) Inventors: Karthik Balakrishnan, Scarsdale, NY (US); Abram L. Falk, Port Chester, NY (US); Martin O. Sandberg, Ossining, NY (US); Jason S. Orcutt, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 574 days.

(21) Appl. No.: 18/046,467

(22) Filed: Oct. 13, 2022

(65) Prior Publication Data
US 2024/0127095 A1    Apr. 18, 2024

(51) Int. Cl.
*G06N 10/40*    (2022.01)
*G02B 5/20*    (2006.01)

(52) U.S. Cl.
CPC .............. *G06N 10/40* (2022.01); *G02B 5/201* (2013.01)

(58) Field of Classification Search
CPC ......... G06N 10/40; G06N 10/00; G02B 5/201
See application file for complete search history.

(56) References Cited

U.S. PATENT DOCUMENTS

| 6,800,837 | B1 | 10/2004 | Ichimura et al. |
| 7,836,007 | B2 | 11/2010 | Beausoleil et al. |
| 10,133,986 | B1 | 11/2018 | Newton et al. |
| 10,170,680 | B2 | 1/2019 | Abraham et al. |

(Continued)

FOREIGN PATENT DOCUMENTS

| JP | 2001-209083 A | 8/2001 |
| JP | 6066314 B2 | 1/2017 |

(Continued)

OTHER PUBLICATIONS

Hertzberg, J. B. et al., "Laser-annealing Josephson junctions for yielding scaled-up superconducting quantum processors", arXiv:2009.00781v4 (2020), 16 pgs.

(Continued)

*Primary Examiner* — Collin X Beatty
(74) *Attorney, Agent, or Firm* — Amin, Turocy & Watson, LLP

(57) ABSTRACT

Methods and systems for mitigating the effects of defects in a quantum processor are provided. A mitigation system includes a quantum processor comprising a plurality of qubits. The system includes a light emitting source that can be tuned to produce light pulses of different wavelengths. The system includes an array of bandpass filters. Each bandpass filter is aligned with a qubit on the quantum processor and has a unique pass band. The system may include a controller configured to receive a selection of a qubit and to tune the light emitting source to emit a light pulse having a wavelength that falls within a range of a bandpass filter that is aligned with the selected qubit. The light pulse is used to scramble an ensemble of strongly coupled two-level system (TLS) in the processor.

22 Claims, 9 Drawing Sheets

(56) References Cited

U.S. PATENT DOCUMENTS

| | | | |
|---|---|---|---|
| 10,170,681 | B1 | 1/2019 | Rosenblatt et al. |
| 10,572,815 | B2 | 2/2020 | Barends |
| 10,956,827 | B2 | 3/2021 | Li |
| 10,962,610 | B2 | 3/2021 | Ibrahim et al. |
| 11,086,191 | B2 | 8/2021 | Hall et al. |
| 11,120,360 | B2 | 9/2021 | Kim et al. |
| 11,195,117 | B2 | 12/2021 | Monroe et al. |
| 2003/0016907 | A1* | 1/2003 | LoCascio ............... B82Y 10/00 385/27 |
| 2009/0169071 | A1 | 7/2009 | Bond et al. |
| 2018/0161923 | A1 | 6/2018 | Matsumoto et al. |
| 2018/0366915 | A1* | 12/2018 | Zilkie ............... G02B 6/29395 |
| 2019/0131511 | A1 | 5/2019 | Clarke et al. |
| 2021/0117845 | A1 | 4/2021 | Choi et al. |
| 2021/0258079 | A1 | 8/2021 | Lauer et al. |
| 2021/0272007 | A1 | 9/2021 | Fatemi et al. |
| 2021/0280764 | A1 | 9/2021 | Topaloglu et al. |
| 2021/0337171 | A1 | 10/2021 | Saffman et al. |
| 2023/0289400 | A1 | 9/2023 | Carroll et al. |
| 2024/0127096 | A1 | 4/2024 | Sandberg et al. |
| 2024/0127097 | A1 | 4/2024 | Falk et al. |

FOREIGN PATENT DOCUMENTS

| | | |
|---|---|---|
| WO | 2018231241 A1 | 12/2018 |
| WO | 2020236574 A1 | 11/2020 |

OTHER PUBLICATIONS

Schweber, B., "MEMS Array Forms Controllable, All-Optical Photonic Switch Matrix", Electronic Design (2019), 6 pgs.

International Search Report and Written Opinion issued Dec. 13, 2023 in related application No. PCT/IB2023/058917, 13 pgs.

Anonymous, "Autler-Townes effect", Wikipedia (2022), 7 pgs.

Carroll, M. et al., "Dynamics of superconducting qubit relaxation times", arXiv:2105.15201v1 (2021); 10 pgs.

Zhao, P. et al., "Combating fluctuations in relaxation times of fixed-frequency transmon qubits with microwave-dressed states", arXiv:2203.07857v2 (2022), 12 pgs.

International Search Report and Written Opinion issued Dec. 13, 2023 is related application No. PCT/IB2023/058916, 12 pgs.

List of IBM Patents or Patent Applications Treated as Related, 2 pgs.

Lecocq, F. et al, "Control and Readout of a Superconducting Qubit Using a Photonic Link", arXiv:2009.01167v1 [quant-ph] (2020); 13 pgs.

Meesala, S. et al, "Effects of Laser Illumination on Superconducting Circuits for Quantum Transduction", CLEO Conference Proceeding (2021); 2 pgs.

Mirhosseini, M. et al., "Superconducting Qubit to Optical Photon Transduction", Nature (2020), vol. 588, pp. 15 pgs.

Karli, Y.et al., "SUPER Scheme in Action: Experimental Demonstration of Red-detuned Excitation of a Quantum Dot", arXiv:2203.00715v1 (2022), 11 pgs.

International Search Report and Written issued Nov. 9, 2023 in related International Patent Application No. PCT/IB2023/058902, 10 pgs.

Non-Final Rejection Mailed on Jul. 1, 2025 for U.S. Appl. No. 18/046,468, 17 page(s).

Non-Final Rejection Mailed on Jul. 10, 2025 for U.S. Appl. No. 18/046,470, 9 page(s).

\* cited by examiner

SELECTIVE OPTICAL TUNING OF QUBIT TWO-LEVEL SYSTEM INTERACTIONS USING BANDPASS FILTERS

BACKGROUND

Technical Field

The present disclosure generally relates to quantum computing, and more particularly, to laser on-demand scrambling of superconducting qubits.

Description of the Related Arts

A quantum bit, or qubit, is the basic element for information encoding in a quantum computer. A two-level system, or TLS, is a spurious quantum system that can couple to a qubit and cause decoherence. TLSs are one of the main sources of decoherence in superconducting quantum circuits. Typically, the TLSs includes two sets: a large set of low frequency two level fluctuators (a bath) and a few discrete two-level systems that are near resonant with the qubit transition. If a TLS strongly interacts with a qubit, the qubit becomes inoperable due to frequency shifts and decoherence.

The nature of these TLSs is not fully understood but are believed to originate from crystal defects, surface defects, or atomic level defects in the materials that generate microscopic dipoles (atomic or electron traps) that interact with a qubit (e.g., couple to the electric fields of the qubit). The TLSs are always present and randomly distributed.

Two-level systems can be either off-resonant or on-resonant with the qubit. On-resonant TLSs are much more detrimental than off-resonant TLSs. These on-resonant, strongly coupled TLS, have a significant detrimental effect on gate fidelities in the processor. This is especially true for processors based on fixed frequency qubits.

SUMMARY

Some embodiments of the disclosure provide methods and systems for mitigating the effects of defects in a quantum processor. A mitigation system includes a quantum processor comprising a plurality of qubits. The system includes a light emitting source that can be tuned to produce light pulses of different wavelengths. The light pulses are used to scramble strongly coupled two-level systems (TLS) in the quantum processor.

In some embodiments, the mitigation system includes an array of bandpass filters. Each bandpass filter is aligned with a qubit on the quantum processor and is tuned to pass a unique range of wavelengths. In an embodiment that can be combined with previous embodiments, the system may include a controller configured to receive a selection of a qubit and to tune the light emitting source to emit a light pulse having a wavelength that fall within a range of a bandpass filter that is aligned with the selected qubit.

In some embodiments, the bandpass filters of the array of bandpass filters are mounted on an optical filter chip that is in a same package as the quantum processor. In an embodiment that can be combined with previous embodiments, the optical filter chip is in the same refrigeration unit as the quantum processor. In some embodiments, the light pulse from the light emitting source is delivered to the quantum processor by an optical fiber. In an embodiment that can be combined with previous embodiments, the optical fiber is attached to a top of the package that includes the quantum processor. In some embodiments, each bandpass filter absorbs or reflects light that is not tuned to the range of wavelengths that it passes.

Two-level systems are one of the most fundamental problems in superconducting qubits, as they are the dominant source of decoherence. The capability to focus light on specific qubits may improve the coherence of qubits quickly, rather than relying on time-consuming processes such as heating the entire quantum processor.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Because strongly coupled TLSs are significantly detrimental to qubit performance in a large quantum circuit, it is salient to develop methods to shift their frequencies to be off-resonant. TLSs are shown to be tunable in frequency by electric fields and by material strain, as TLSs tend to slowly drift in frequency (spectral diffusion) over time on a timescale of hours to days. TLS can therefore be mitigated by waiting extensively for it to diffuse. TLS can also be removed from the qubit by heating or thermal cycling the whole processor up to several Kelvin. Heating the entire processor is a very time-consuming process, as it typically takes a long time (e.g., hours) and involves full recalibration of the processor. Heating the entire processor is also a stochastic global process that cannot be used to target specific qubits. It is not certain that any specific TLS will shift frequency by the global heating. There is also a possibility that a qubit previously freed from a TLS may interact with another TLS after the heating.

Some embodiments provide methods and systems for mitigating the effects of strongly coupled two-level systems. Specifically, optical illumination is used to scramble the frequencies of the two-level systems. Scrambling TLS distributions is used to improve coherence times and to maintain stable quantum processor performance over time. The optical illumination may use telecom-frequency lights at 1310 nm and 1550 nm. In some embodiments, the optical illumination is delivered through a dilution refrigerator to a quantum processor or any array of qubits, with the light selectively focused onto individual qubits or globally applied to all qubits of the quantum processor.

Figure 1:
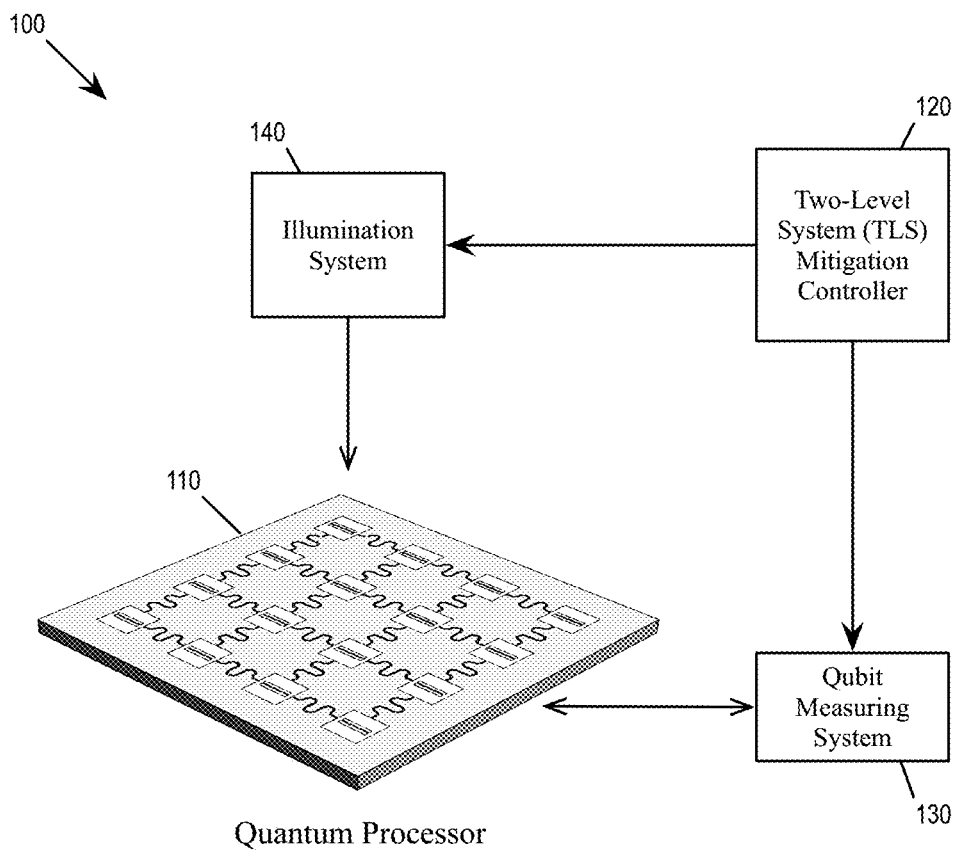
FIG. 1 illustrates a two-level system mitigation system that uses illumination to mitigate the effect of two-level systems in a quantum processor, consistent with an illustrative embodiment.

FIG. 1 illustrates a TLS mitigation system 100 that uses illumination to mitigate the effect of TLSs in a quantum processor 110. As illustrated, a TLS mitigation controller 120 controls a qubit measuring system 130 and an illumination system 140. The qubit measuring system 130 is used to detect or identify TLS in the quantum processor 110. The illumination system 140 is used to apply light to the quantum processor 110.

The measuring system 130 provide performance parameters of qubits in the quantum processor 110, including qubit decoherence time (or relaxation time) at different electric field frequencies. In some embodiments, the performance parameters of a qubit at different frequencies are captured. The mitigation controller 120 may use the captured performance parameters of a qubit to produce a spectrogram for the qubit. The spectrogram can be used as a TLS landscape to identify the frequencies at which TLSs are strongly coupled with the qubit (e.g., by identifying the frequencies at which the qubit's decoherence times are shortened by more than 25%.)

The illumination system 140 is used to provide light pulses to the quantum processor 110. The light pulses may scramble the frequency landscape of the TLSs so that the TLSs would not be strongly coupled with the qubits, e.g., becoming off-resonant so that the qubit's decoherence time is at least 75% of an ideal or expected relaxation time.

The TLS mitigation controller 120 may use the TLS landscape generated based on measurements provided by the measuring system 130 to determine when and how to apply the light pulses to the quantum processor 110 and to control the illumination system 140 accordingly.

In some embodiments, one or more laser sources are used to scramble the frequencies of TLSs. Laser pulses are used to change the TLS landscape of a superconducting quantum processor on very short time scales (e.g., less than one second). In some embodiments, very short laser pulse may be applied to instantaneously shift the TLS frequencies. The recovery time from the laser pulse is of the timescale of seconds (or less) compared to hours that may be involved for warming the whole quantum processor. The light pulses may be visible light or infrared light.

Figure 2:
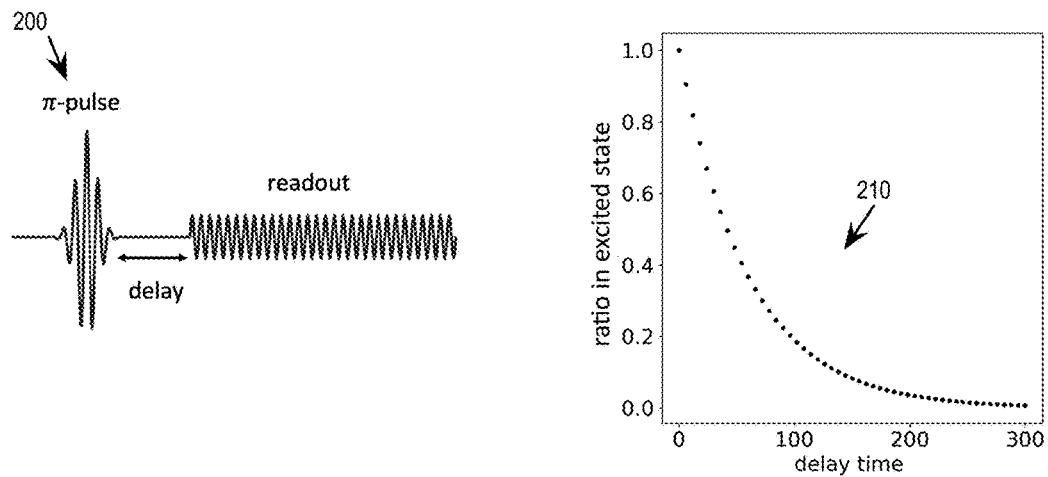
FIG. 2 illustrates a method for measuring the performance of a qubit.

FIG. 2 conceptually illustrates a method for measuring the performance of a qubit. A microwave pulse 200 of calibrated amplitude, frequency, and duration is applied to the qubit to bring the qubit to its excited state. The state of the qubit is measured at a number of different delay times after the application of the microwave pulse. The measurements are repeated and averaged to give a characteristic exponential decay curve 210. (The vertical axis of the decay curve 210 refers to the ratio of measurements taken of the qubit in which the qubit is found to be in the excited state at a given delay time, so 1.0 correspond to finding the qubit in the excited state 100% of the measurements taken at the given delay time.) The time constant of the decay curve 210 is used to measure the performance of the qubit.

Figure 3:
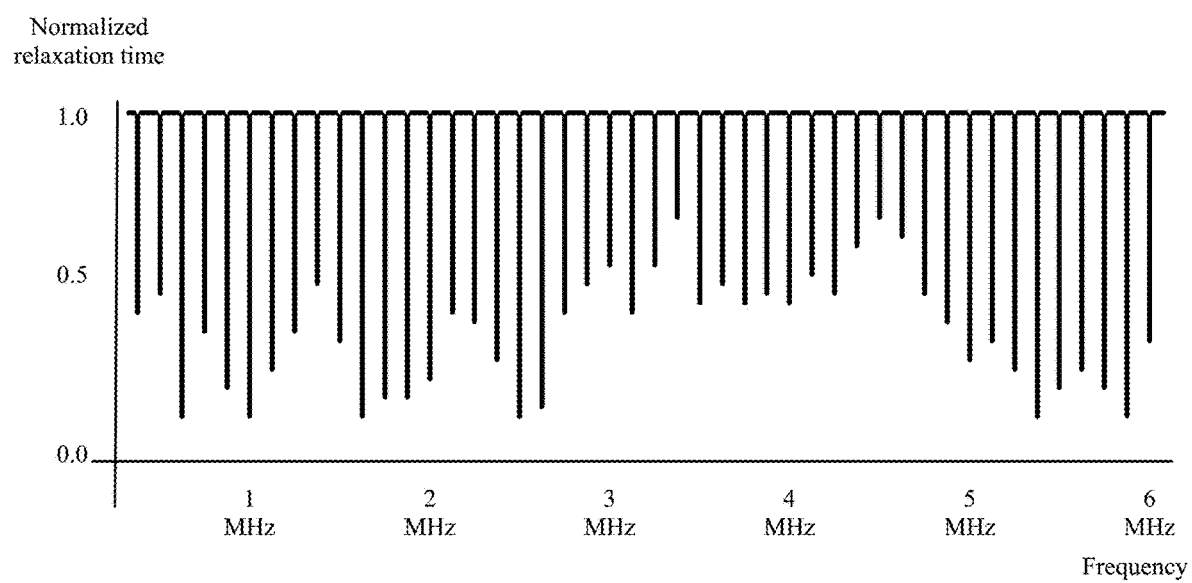
FIG. 3 shows an example two-level system landscape, consistent with an illustrative embodiment.

Defects can resonantly couple to qubits and serve as a strong energy-relaxation channel with a Lorentzian spectroscopic signature. This signature can be used to identify defects. FIG. 3 shows an example TLS landscape. The TLS landscape is based on measurement of a flux tunable quantum bit showing several regions of strongly coupled TLSs. If a fixed frequency transmon incidentally has a transition frequency in the near vicinity of a strong TLS, the qubit performance becomes severely degraded, i.e., having relaxation or decoherence times that are significantly shortened. In the figure, the measured qubit relaxation times (also referred to as Ti) are normalized with respect to an ideal or expected relaxation time. Thus, at frequencies with weak or no TLS coupling, the normalized relaxation times are near 1.0, while at frequencies with strong TLS coupling, the normalized relaxation time can drop significantly (to 0.1 or less).

Figure 4:
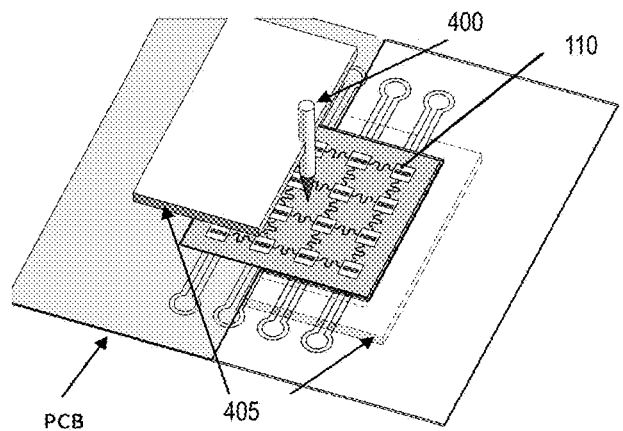
FIG. 4 shows a quantum processor having qubits that are illuminated by optical fiber, consistent with an illustrative embodiment.

FIG. 4 shows a quantum processor having qubits that are illuminated by optical fiber. The quantum processor may be built on silicon, sapphire, or other dielectric substrates. In some embodiments, a laser or optical fiber pierces the quantum processor chip to provide the illumination. As illustrated, an optical fiber 400 is attached to an enclosure 405 over the quantum processor 110. Light pulses can be guided from outside of the enclosure to illuminate part or all of the quantum processor 110. The quantum processor can be illuminated from either surface (front or back) since silicon is transparent to infrared lights with wavelength of 1100 nm or higher. Light pulses applied to the quantum processor or qubits can shift or scramble the frequency landscape of the TLS. It can be shown that, after a light pulse, TLSs may move in frequency in a random fashion. On the other hand, with no light pulse applied, TLSs may remain nearly constant over hours.

Figure 5:
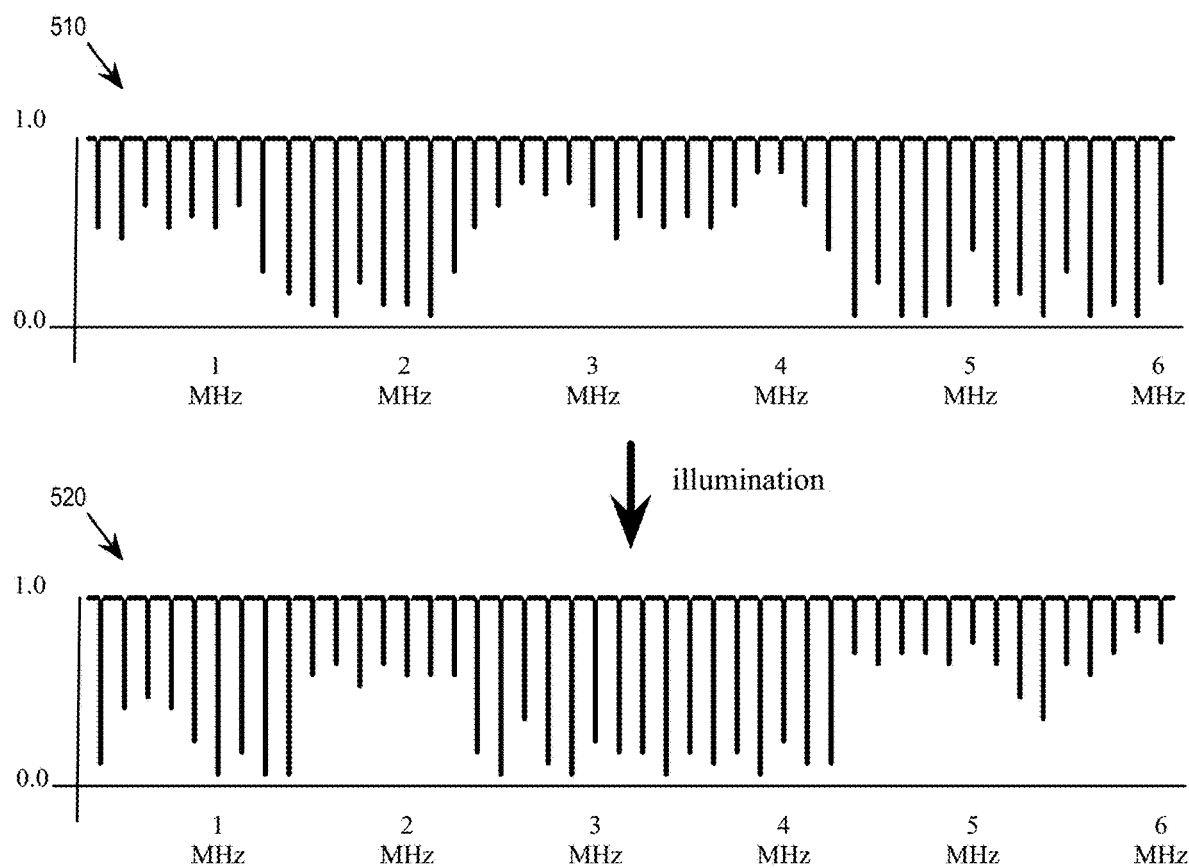
FIG. 5 shows spectroscopes of a qubit in the quantum processor before and after illumination, consistent with an illustrative embodiment.

FIG. 5 shows spectrograms of a qubit in the quantum processor before and after illumination. The figure shows two spectrograms 510 and 520 that show the relaxation times of a qubit in the quantum processor at different frequencies. The first spectrogram 510 is based on measurements of the qubit taken before a light pulse is applied and the second spectrogram 520 is based on measurements of the qubit taken after the light pulse is applied. As illustrated, after the application of the light pulse, the profile of qubit relaxation times at different frequencies has shifted. This is because the TLSs in the quantum processor have been scrambled by the applied light pulse. Based on the TLS landscape as shown by the spectrogram 520, the TLS mitigation controller 120 may determine that (i) at the frequencies of interest, the TLSs would not significantly impair the operation of the qubit, or (ii) the qubit is still impaired by TLS at the frequencies of interest so that additional light pulses are needed to further scramble the TLSs. This determination may be determined by whether the relaxation time of a qubit has dropped below a particular threshold ratio (e.g., 0.75 or 75%) of an expected relaxation time.

Since the laser operation is very fast, the process of TLS frequency scrambling by laser illumination can iterate several times to find an ideal TLS configuration where all severe or strongly coupled TLS interactions has been eliminated. This will significantly improve the functioning of the quantum processor. The ability to rapidly cycle through TLS configuration and find an optimal configuration has a significant impact on the performance on any large-scale fixed frequency quantum processor.

Figure 6:
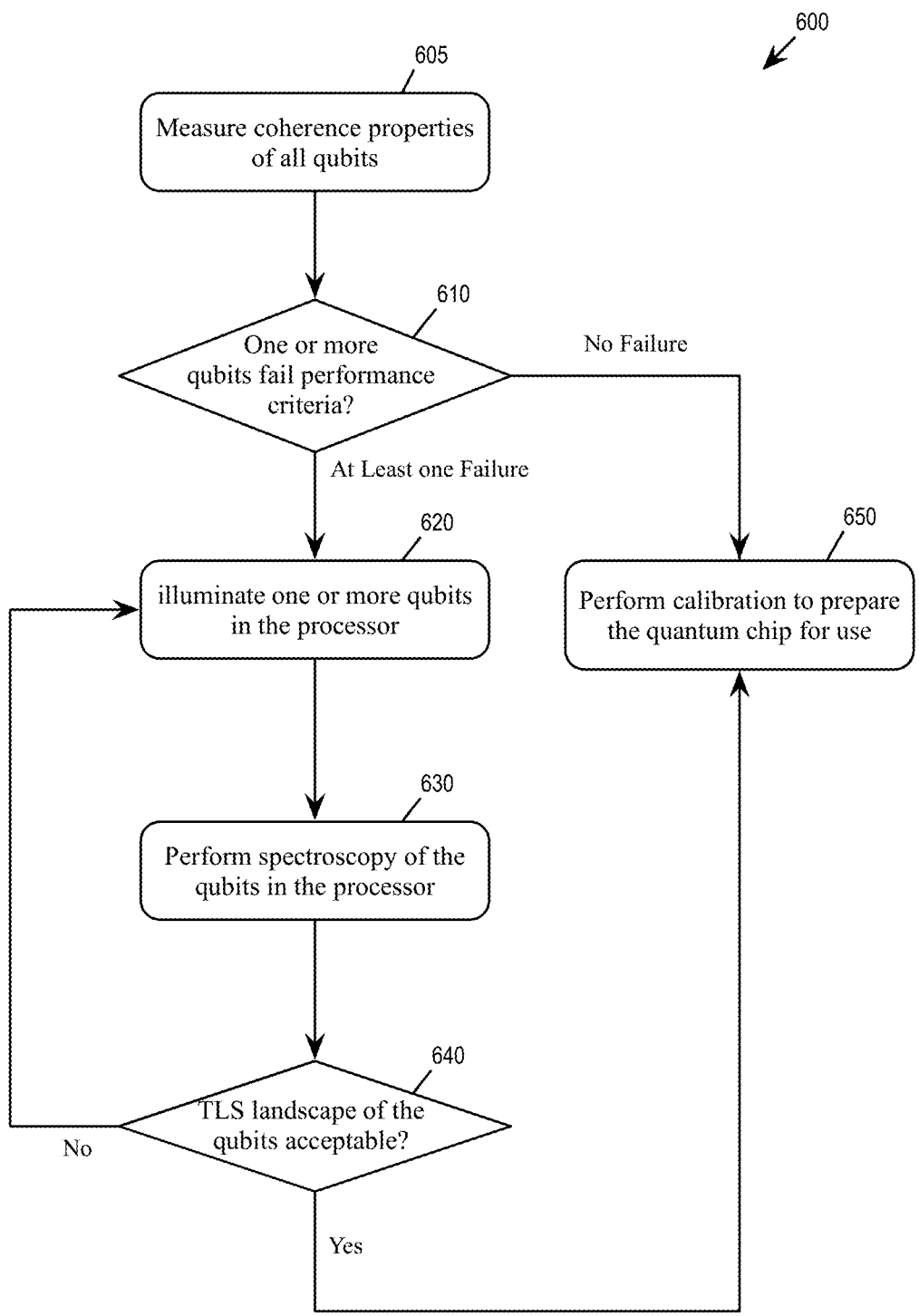
FIG. 6 conceptually illustrates a process for iteratively applying illumination to a quantum processor for eliminating strongly coupled two-level system interactions, consistent with an illustrative embodiment.

FIG. 6 conceptually illustrates a process 600 for iteratively applying illumination to a quantum processor for eliminating strongly coupled TLS interactions, consistent with an illustrative embodiment. The TLS mitigation system 100 or the TLS mitigation controller 120 may perform the process to mitigate deleterious effects of TLSs for readying the quantum processor for use. The process rearranges the TLS landscape by rapidly cycling through TLS configurations. The properties of the qubits are measured to determine whether the scrambling by illumination could improve the processor performance. The iterative search is performed to find a good global TLS configuration across the different qubits of the quantum processor. In some embodiments, one or more processing units (e.g., processor) of a computing device implementing the TLS mitigation controller 120 perform the process 600 by executing instructions stored in a computer readable medium.

The system measures (at block 605) coherence properties of all qubits. FIG. 2 above describes an example method of measuring qubits.

The system determines (at block 610) whether one or more qubits fail performance criteria. The system may receive performance parameters (e.g., coherence properties) of one or more qubits in the quantum processor to identify a qubit that fails to meet a performance threshold. If none of the qubits fail to meet the performance criteria, the system proceeds to 650 to calibrate the quantum processor so it is ready for use. If at least one qubit fails to meet the performance criteria, the process proceeds to 620.

At block 620, the system illuminates one or more qubits in the processor. The system may apply global light pulses to the processor such that multiple qubits in the quantum processor are illuminated. The system may also use local light pulses confined to qubits that are identified as being subjected to a bad TLS interaction.

The system performs (at block 630) spectroscopy (e.g., Stark spectroscopy, which is a method to obtain a small fast frequency tuning of a quantum bit through the AC stark effect) on the qubits of processor to obtain a spectrogram as TLS landscape. The TLS landscape of a qubit is a collection of measured relaxation times of the qubit across different probe frequencies. The system receives or captures the qubit relaxation times that are measured at different qubit frequencies, including relaxation times that are measured before and after light pulses. In some embodiments, the system may perform multiple sweeps of the frequencies to obtain multiple sets of relaxation times. Since the system identifies qubits that failed the performance requirement, and the received qubit relaxation times would include relaxation times of the identified failing qubit.

The system determines (at block 640) whether the TLS landscape is acceptable, e.g., whether there is a good global TLS configuration across the different qubits of the quantum processor, or whether there is a strongly coupled TLS in the quantum processor. If the TLS landscape is acceptable, the process proceeds to 650 to calibrate the quantum processor so it is ready for use. If the TLS landscape is not acceptable, e.g., there is strong coupling between a qubit and a TLS to cause severe degradation of in decoherence time (e.g., less than 75% of the expected qubit relaxation time), the process returns to 620 to again apply laser pulses and measure qubit performances. In other words, the system applies a first light pulse to illuminate the quantum processor, then determines whether to apply a second light pulse to illuminate the quantum processor based on the current TLS configuration or landscape. This is an iterative process of applying light pulses and examining qubit relaxation times to eliminate or minimize TLS interaction with qubits.

In order to target specific qubits with the light pulses to scramble TLS distributions, some embodiments of the disclosure provide a method for selectively focusing light pulses onto individual qubits. The light is delivered through a dilution refrigerator to a quantum processor having an array of qubits. In some embodiments, an optical fiber is used to deliver the light pulse, and a set of bandpass filters is used to selectively address a qubit or subset of qubits. This allows selective addressing of problematic qubits while not adversely affecting other, well-performing qubits, even for quantum processors with large number of qubits.

In some embodiments, the qubit chip with an array of qubits (quantum processor) may be fabricated on a substrate. The qubit chip has a superconducting transmon qubit-based quantum processor design. An optical fiber is mounted onto the qubit chip, and a laser source can illuminate the qubit chip. The qubit chip is attached to an optical filter chip (also fabricated on a substrate) that includes an array of bandpass filters. Each bandpass filter corresponds to a qubit or a subset of the qubits in the qubit chip. The laser source is tuned and pulsed at the center frequency of the intended qubit(s) to selectively apply the laser pulse to each intended qubit or each subset of qubits to shift TLS landscape.

In some embodiments, each bandpass filter in the optical filter chip is aligned with a qubit on the quantum processor and tuned to a unique range of wavelengths. The light emitting source can be tuned to produce light pulses of different wavelengths. A controller (e.g., the TLS mitigation controller 120) may be configured to receive a selection of a qubit and to tune the light emitting source to emit a light pulse having a wavelength that fall within a range of a bandpass filter that is aligned with the selected qubit.

Figure 7:
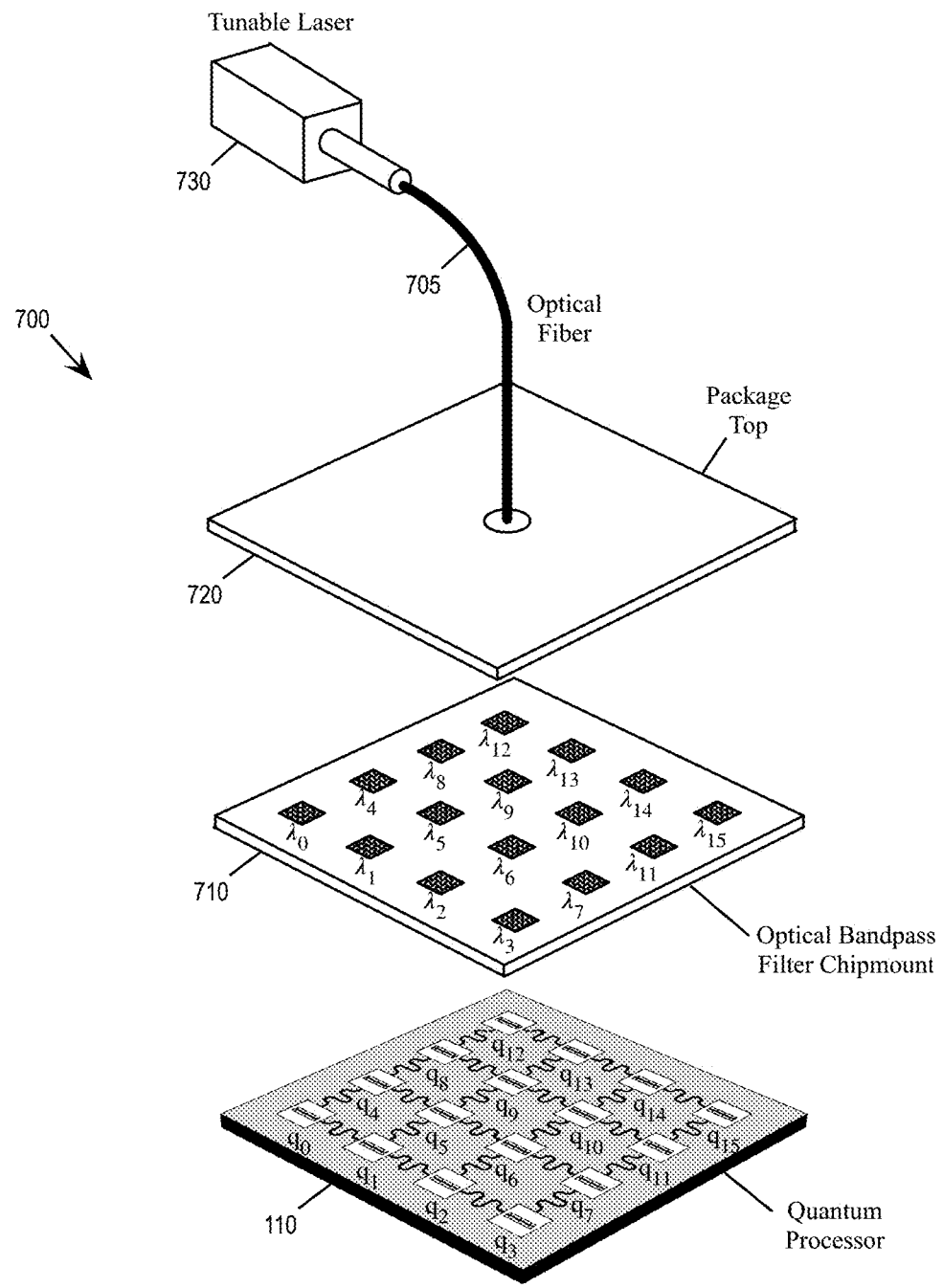
FIG. 7 conceptually illustrates a qubit illumination structure that includes an optical filter chip for targeting light pulses at a specific qubit, consistent with an illustrative embodiment.

FIG. 7 conceptually illustrates a qubit illumination structure 700 that includes an optical filter chip for targeting light pulses at a specific qubit. As illustrated, the qubit illumination structure includes the quantum processor 110, an optical filter chip 710, and a package top 720. The optical filter chip 710 has an array of bandpass filters ($\lambda_0$-$\lambda_{15}$) and is mounted over the qubit chip 110, which has an array of qubits ($q_0$-$q_{15}$). Each bandpass filter on the optical filter chip 710 is tuned to have a unique range of wavelengths. An optical fiber 705 is attached to the package top 720 to deliver light pulses from a tunable laser 730 to the qubit chip 110 through the bandpass filters in the optical filter chip 710.

The array of bandpass filters ($\lambda_0$-$\lambda_{15}$) in the optical filter chip 710 allows a qubit that receives illumination to be selected based on the wavelength of the light emitted by the tunable laser 730. Specifically, bandpass filters at different positions are tuned to pass lights of different wave lengths, such that light of a particular wavelength can only pass through a particular bandpass filter to reach a specific qubit, while the other bandpass filters over other qubits would block the light. In some embodiments, the bandpass filters are of the absorbing type, so when the light is directed at a given qubit, the scattering of the light into neighboring qubits are minimized.

Figure 8:
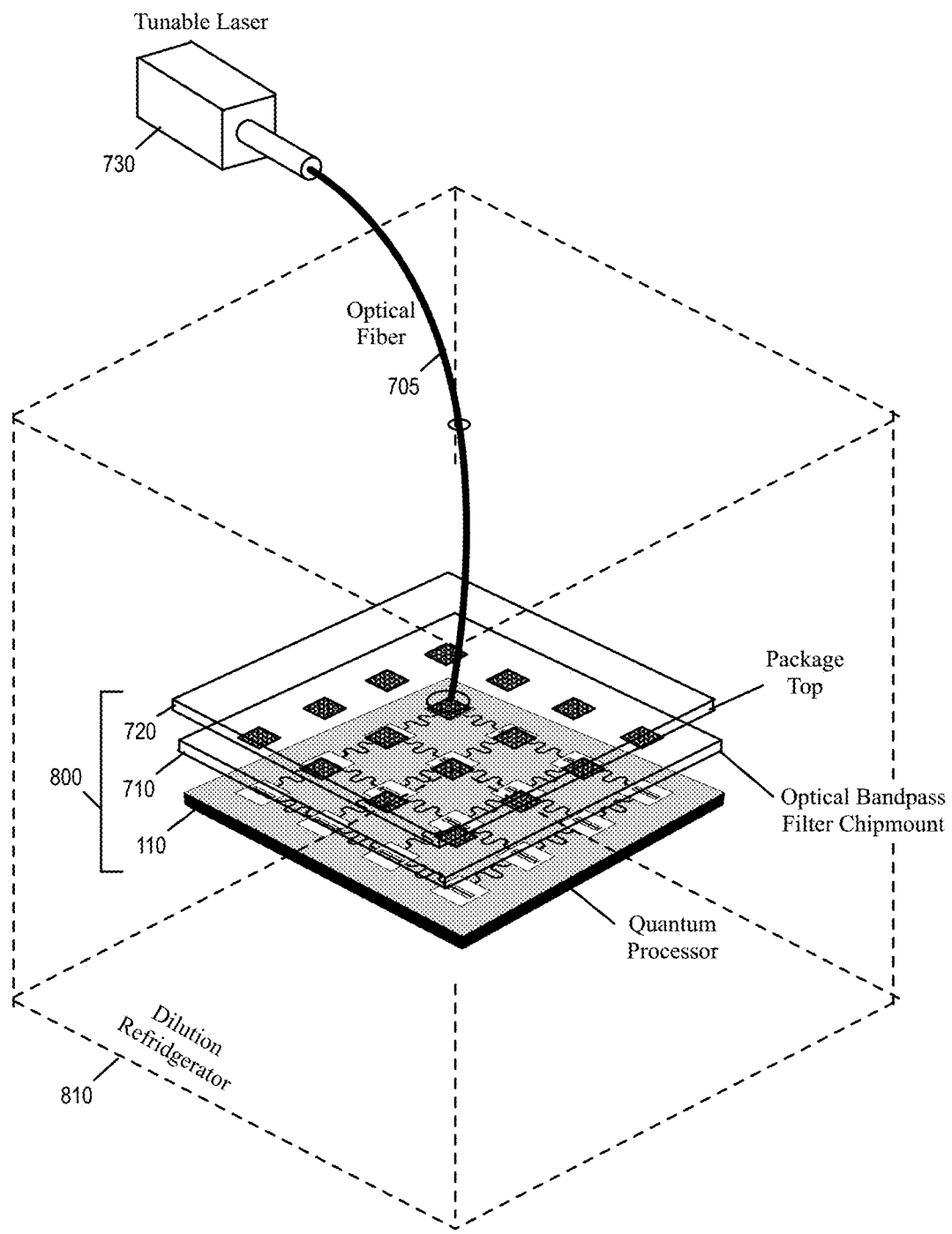
FIG. 8 conceptually illustrates the qubit illumination structure in a package and operating in a dilution refrigerator, consistent with an illustrative embodiment.

FIG. 8 conceptually illustrates the qubit illumination structure 700 in a package 800 and operating in a dilution refrigerator 810. The package includes the quantum processor 110, the optical filter chip 710, and the package top 720. The tunable laser 730 is outside of the dilution refrigerator 810. The light pulses provided by the tunable laser 730 is delivered by the optical fiber 705 into the dilution refrigerator 810 for the qubit illumination structure 700. Once in the package 800, the light pulse is processed by the bandpass filters ($\lambda_0$-$\lambda_{15}$) in the optical filter chip 710. As the light pulse is tuned to a wavelength that matches a particular bandpass filter, only that particular bandpass filter would allow the light pulse to pass through to reach the quantum processor 110.

Figure 9A:
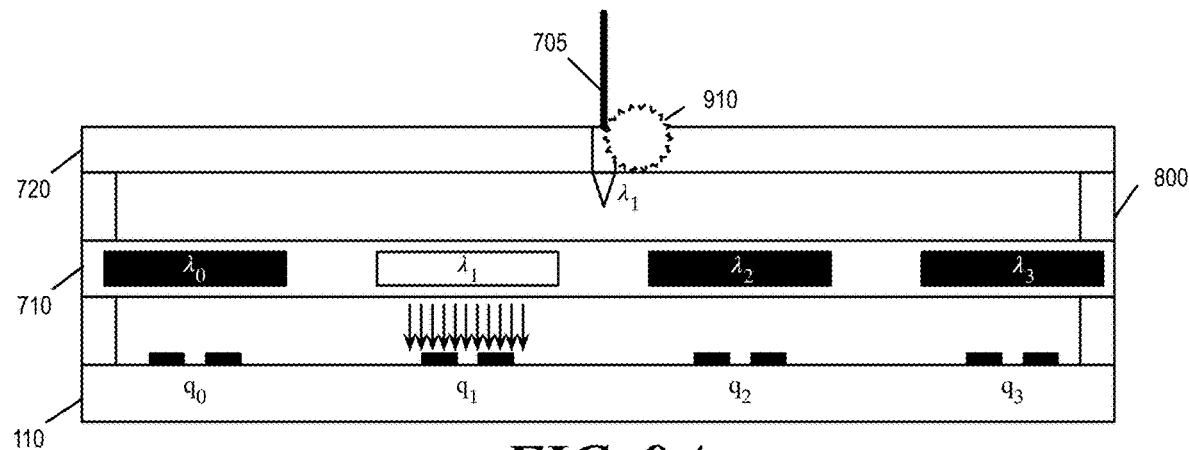
FIGS. 9A-C illustrate using bandpass filters to target light pulses at a specific qubit.
Figure 9B:
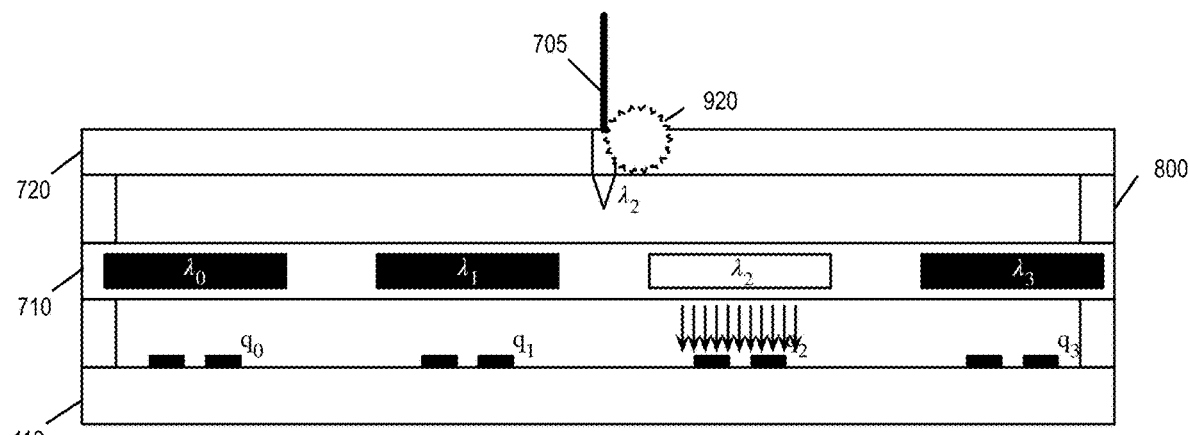
Figure 9C:
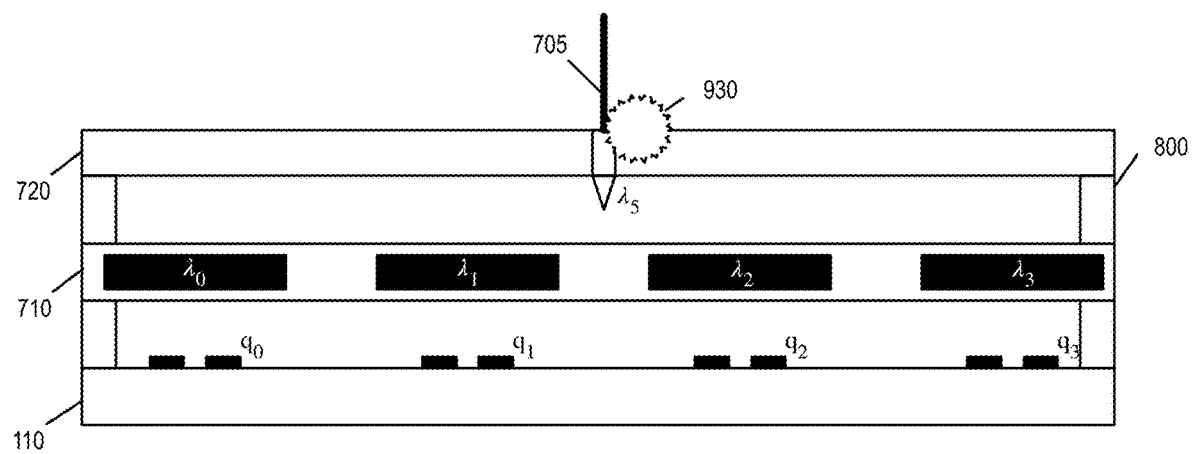

FIGS. 9A-C illustrate using bandpass filters to target light pulses at a specific qubit. The figures illustrate the cross-section views of the package 800 (housing the qubit illumination structure 700), showing qubits $q_0$, $q_1$, $q_2$, and $q_3$ of the quantum processor 110 and corresponding bandpass filters $\lambda_0$, $\lambda_1$, $\lambda_2$, and $\lambda_3$ in the optical filter chip 710.

FIG. 9A shows the optical fiber 705 carrying a light pulse 910 with wavelength in the pass band of the bandpass filter $\lambda_1$. The light pulse 910 passes through the bandpass filter $\lambda_1$ to illuminate the qubit $q_1$. All other bandpass filters block the light pulse, so no other qubits are illuminated. FIG. 9B shows the optical fiber 705 carrying a light pulse 920 with wavelength in the range of the bandpass filter $\lambda_2$ reaching the qubit $q_2$. FIG. 9C shows the optical fiber 705 carrying a light pulse 930 with wavelength in the range of bandpass filter $\lambda_5$. This light pulse is blocked by all four bandpass filters $\lambda_0$, $\lambda_1$, $\lambda_2$, and $\lambda_3$ since the wavelength is not in the range of the bandpass filters.

Figure 10:
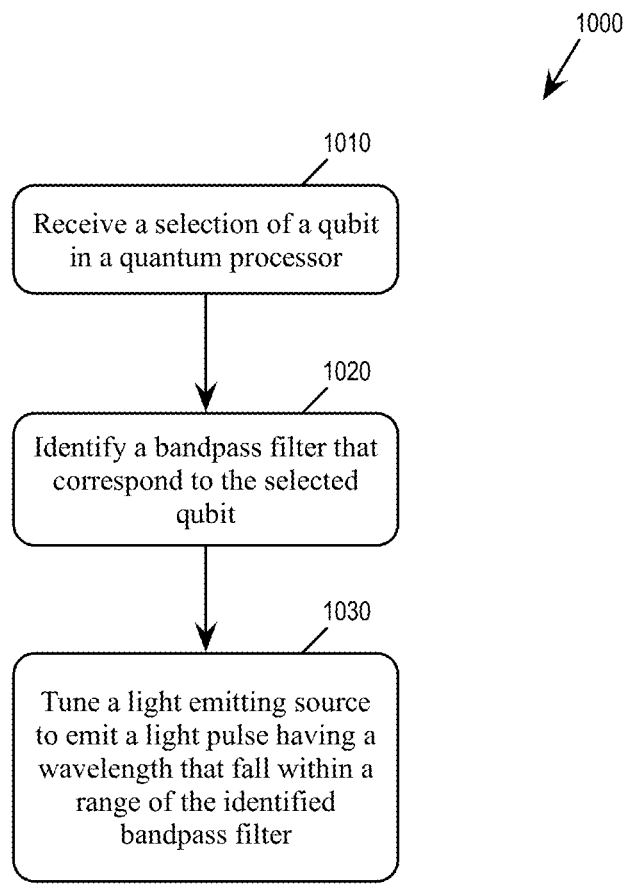
FIG. 10 conceptually illustrates a process for using optical bandpass filters to target light pulses at a selected qubit, consistent with an illustrative embodiment.

FIG. 10 conceptually illustrates a process 1000 for using optical bandpass filters to target light pulses at a selected qubit, consistent with an illustrative embodiment. The TLS mitigation system 100 or the TLS mitigation controller 120 may perform the process to mitigate deleterious effects of TLSs for readying the quantum processor for use. In some embodiments, one or more processing units (e.g., processor) of a computing device implementing the TLS mitigation controller 120 perform the process 1000 by executing instructions stored in a computer readable medium.

The system receives (at block 1010) a selection of a qubit in a quantum processor having an array of qubits.

The system identifies (at block 1020) a bandpass filter in an array of band filters that correspond to the selected qubit. Each bandpass filter in the array is (i) aligned with a different qubit on the quantum processor and (ii) tuned to a unique range of wavelengths. In some embodiments, each bandpass filter absorbs light that are not in its range of wavelengths. The bandpass filters of the array of bandpass filters are mounted on an optical filter chip (e.g., 710) that is in a same package (e.g., the package 800) as the quantum processor. The optical filter chip is in a same refrigeration unit (e.g., the refrigeration unit 810) as the quantum processor.

The system tunes (at block 1030) a light emitting source (e.g., tunable laser 730) to emit a light pulse having a wavelength that fall within a range of the identified bandpass filter. The light pulse is used to scramble a two-level system (TLS) in the quantum processor. The light pulse from the light emitting source is delivered to the quantum processor by an optical fiber. The optical fiber is attached to a top of the package that includes the quantum processor.

The present application may employ a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 6 and 10) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
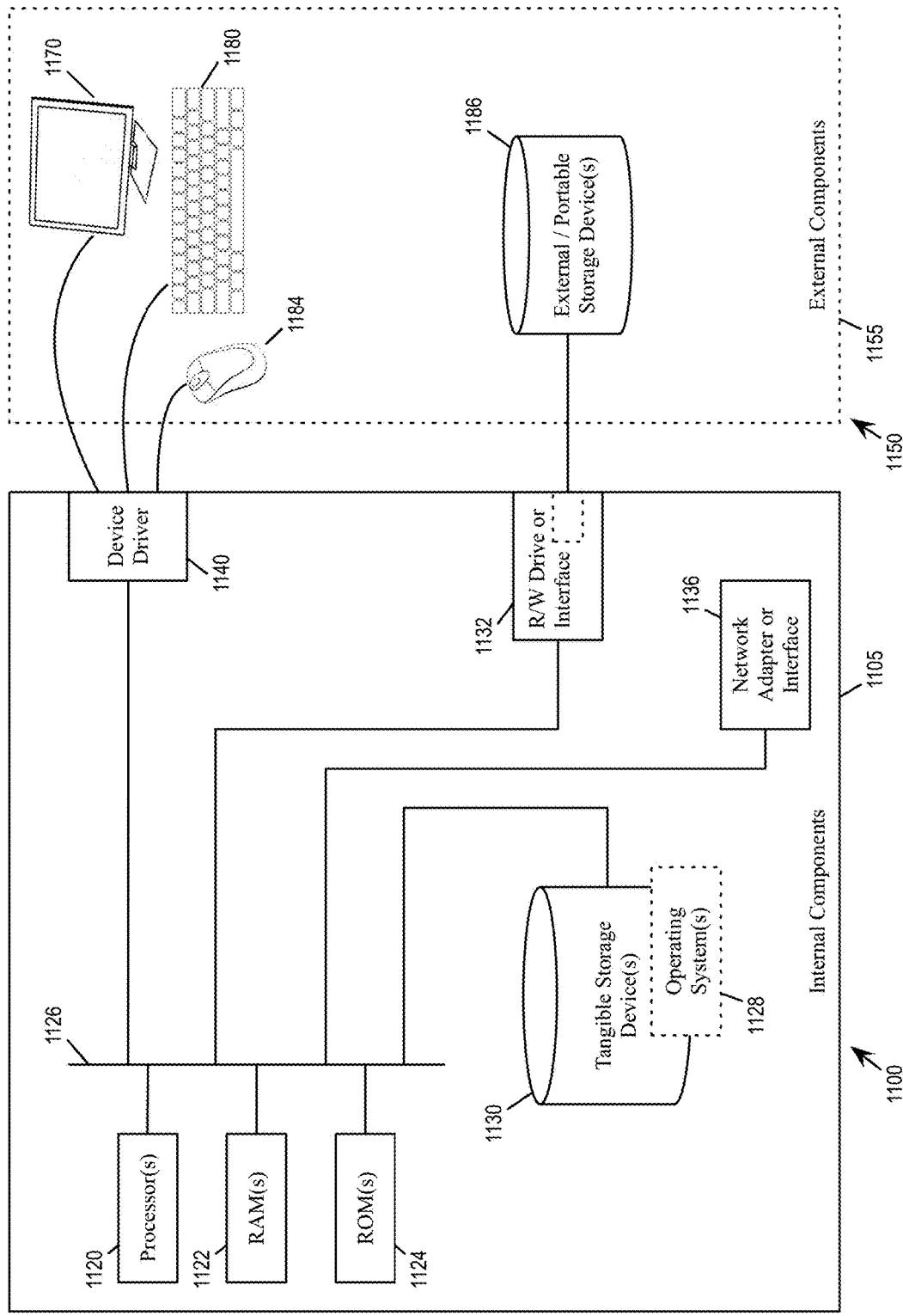
FIG. 11 shows a block diagram of the components of a data processing system in accordance with an illustrative embodiment of the present disclosure.

FIG. 11 shows a block diagram of the components of data processing systems 1100 and 1150 that may be used to implement the TLS mitigation controller 120 in accordance with an illustrative embodiment of the present disclosure. It should be appreciated that FIG. 11 provides only an illustration of one implementation and does not imply any limitations with regard to the environments in which different embodiments may be implemented. Many modifications to the depicted environments may be made based on design and implementation requirements.

Data processing systems 1100 and 1150 are representative of any electronic device capable of executing machine-readable program instructions. Data processing systems 1100 and 1150 may be representative of a smart phone, a computer system, PDA, or other electronic devices. Examples of computing systems, environments, and/or configurations that may represented by data processing systems 1100 and 1150 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1100 and 1150 may include a set of internal components 1105 and a set of external components 1155 illustrated in FIG. 11. The set of internal components 1105 includes one or more processors 1120, one or more computer-readable RAMs 1122 and one or more computer-readable ROMs 1124 on one or more buses 1126, and one or more operating systems 1128 and one or more computer-readable tangible storage devices 1130. The one or more operating systems 1128 and programs such as the programs for executing the processes 600 and 1000 are stored on one or more computer-readable tangible storage devices 1130 for execution by one or more processors 1120 via one or more RAMs 1122 (which typically include cache memory). In the embodiment illustrated in FIG. 11, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

The set of internal components 1105 also includes a R/W drive or interface 1132 to read from and write to one or more portable computer-readable tangible storage devices 1186 such as a CD-ROM, DVD, memory stick, magnetic tape, magnetic disk, optical disk or semiconductor storage device. The instructions for executing the processes 600 and 1000 can be stored on one or more of the respective portable computer-readable tangible storage devices 1186, read via the respective R/W drive or interface 1132 and loaded into the respective hard drive 1130.

The set of internal components 1105 may also include network adapters (or switch port cards) or interfaces 1136 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1136. From the network adapters (or switch port adaptors) or interfaces 1136, the instructions and data of the described programs or processes are loaded into the respective hard drive 1130. The network may comprise copper wires, optical fibers, wireless transmission, routers, firewalls, switches, gateway computers and/or edge servers.

The set of external components 1155 can include a computer display monitor 1170, a keyboard 1180, and a computer mouse 1184. The set of external components 1155 can also include touch screens, virtual keyboards, touch pads, pointing devices, and other human interface devices. The set of internal components 1105 also includes device drivers 1140 to interface to computer display monitor 1170, keyboard 1180 and computer mouse 1184. The device drivers 1140, R/W drive or interface 1132 and network adapter or interface 1136 comprise hardware and software (stored in storage device 1130 and/or ROM 1124).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a quantum processor comprising a first substrate having a plurality of qubits arranged at respective first distinct locations of the first substrate;
   an optical filter chip mounted on the quantum processor, wherein the optical filter chip comprises a second substrate having a plurality of bandpass filters arranged at respective second distinct locations of the second substrate, and wherein each bandpass filter of the plurality of bandpass filters has a respective second distinct location that is physically aligned with a respective first distinct location of a corresponding qubit of the plurality of qubits; and
   a light emitting source that can be tuned to produce light pulses of different wavelengths that are emitted onto a surface of the optical filter chip that is opposite another surface of the optical filter chip facing the quantum processor.

2. The system of claim 1, wherein each bandpass filter is tuned to a respective range of wavelengths for the corresponding qubit that mitigates decoherence of the corresponding qubit.

3. The system of claim 2, further comprising a controller configured to receive a selection of a qubit of the plurality of qubits and to tune the light emitting source to emit a light pulse having a wavelength that falls within the respective range of wavelengths for the selected qubit.

4. The system of claim 1, wherein the optical filter chip is in a same package as the quantum processor.

5. The system of claim 1, wherein the optical filter chip is in a same refrigeration unit as the quantum processor.

6. The system of claim 4, wherein the light pulse from the light emitting source is delivered to the optical filter chip by an optical fiber.

7. The system of claim 6, wherein the optical fiber is attached to a top of the package above the optical filter chip.

8. The system of claim 2, wherein each bandpass filter absorbs light that is not in the respective range of wavelengths for the corresponding qubit.

9. A method comprising:
   receiving, by a system comprising a processor, a selection of a qubit in a quantum processor comprising a first substrate having an array of qubits arranged at respective first distinct locations of the first substrate;
   identifying, by the system, a bandpass filter in an optical filter chip mounted on the quantum processor that corresponds to the selected qubit, wherein the optical filter chip comprises a second substrate having an array of bandpass filters arranged at respective second distinct locations of the second substrate, and wherein each bandpass filter of the array of bandpass filters has a respective second distinct location that is physically aligned with a respective first distinct location of a corresponding qubit of the array of qubits, and wherein each bandpass filter is tuned to a respective range of wavelengths for the corresponding qubit that mitigates decoherence of the corresponding qubit; and
   tuning, by the system, a light emitting source to emit, onto a surface of the optical filter chip that is opposite another surface of the optical filter chip facing the quantum processor, a light pulse having a wavelength that falls within the respective range of wavelengths of the tuning of the identified bandpass filter.

10. The method of claim 9, wherein the optical filter chip is in a same package as the quantum processor.

11. The method of claim 9, wherein the optical filter chip is in a same refrigeration unit as the quantum processor.

12. The method of claim 10, further comprising delivering the light pulse by an optical fiber.

13. The method of claim 12, wherein the optical fiber is attached to a top of the package above the optical filter chip.

14. The method of claim 9, wherein each bandpass filter absorbs light that is not in the respective range of wavelengths for the corresponding qubit.

15. A method comprising:
   receiving a light pulse of a particular wavelength from a light emitting source; and
   passing the light pulse through an optical filter chip comprising a plurality of bandpass filters to a quantum processor comprising a plurality of qubits,
   wherein the optical filter chip is between the light emitting source and the quantum processor,
   wherein the quantum processor comprises a first substrate having the plurality of qubits arranged at respective first distinct locations of the first substrate,
   wherein the optical filter chip comprises a second substrate having the plurality of bandpass filters arranged at respective second distinct locations of the second substrate,
   wherein each bandpass filter of the plurality of bandpass filters has a respective second distinct location that is physically aligned with a respective first distinct location of a corresponding qubit of the plurality of qubits, wherein each bandpass filter is tuned to a respective range of wavelengths for the corresponding qubit that mitigates decoherence of the corresponding qubit, and wherein the light pulse passes through the optical filter chip at a bandpass filter of the plurality of bandpass filters that is tuned to a range of wavelengths that encompasses the particular wavelength.

16. The method of claim 15, wherein different bandpass filters in the plurality of bandpass filters are tuned to respective different ranges of wavelengths.

17. The method of claim 15, wherein the light emitting source can be tuned to emit light pulses of different wavelengths.

18. The method of claim 15, wherein each bandpass filter absorbs light that is not in the respective range of wavelengths for the corresponding qubit.

19. The method of claim 15, wherein the optical filter chip is in a same package as the quantum processor.

20. The method of claim 15, wherein the optical filter chip is in a same refrigeration unit as the quantum processor.

21. The method of claim 19, further comprising delivering the light pulse from the light emitting source to the optical filter chip by an optical fiber.

22. The method of claim 21, wherein the optical fiber is attached to a top of the package above the optical filter chip.

* * * * *